Oct. 18, 1927.
A. HAWKS
1,646,023
AGRICULTURAL IMPLEMENT
Filed June 26, 1926
2 Sheets-Sheet 1
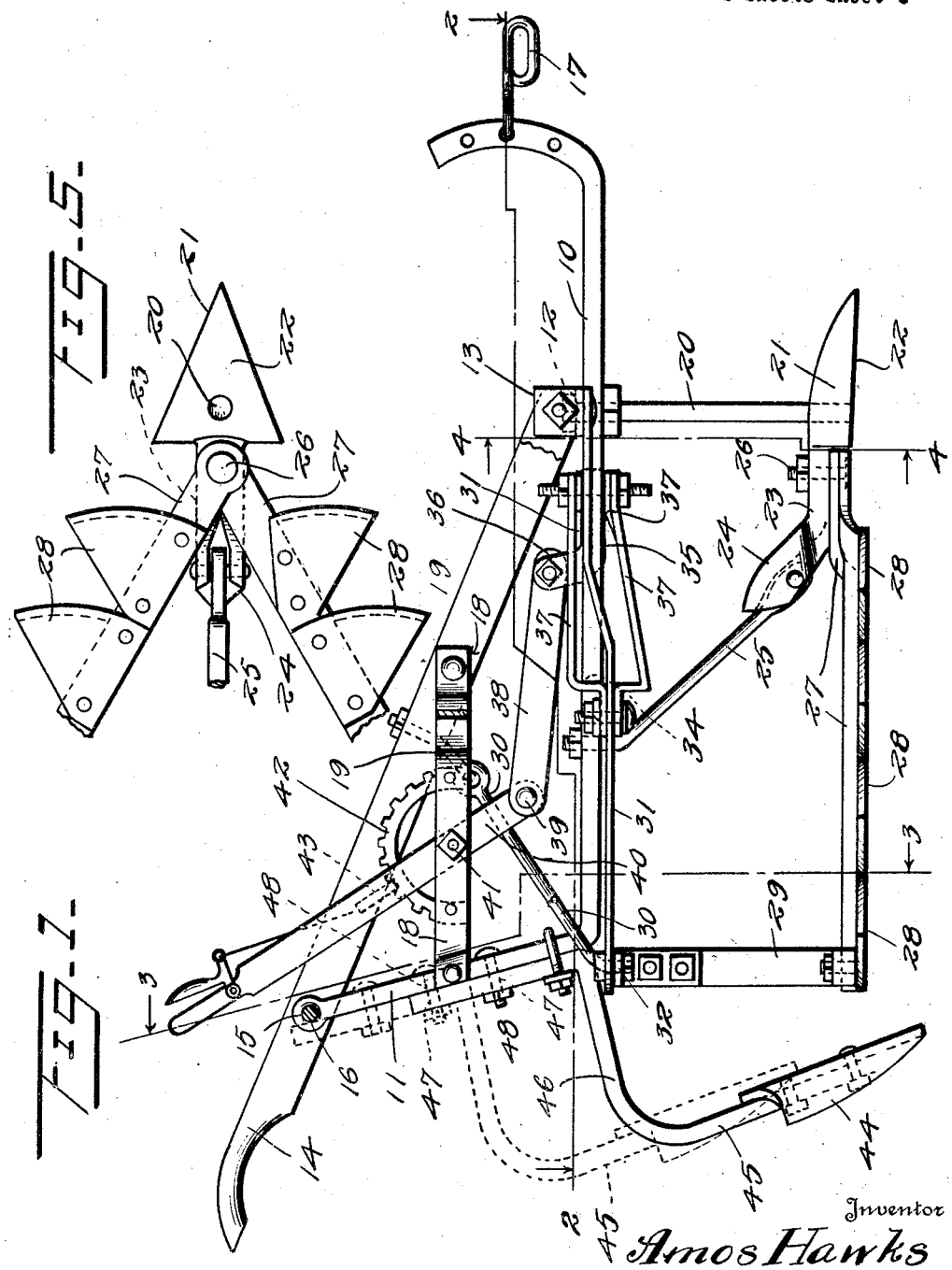
Inventor
Amos Hawks
By Watson E. Coleman
Attorney Oct. 18, 1927.
A. HAWKS
1,646,023
AGRICULTURAL IMPLEMENT
Filed June 26, 1926
2 Sheets-Sheet 2
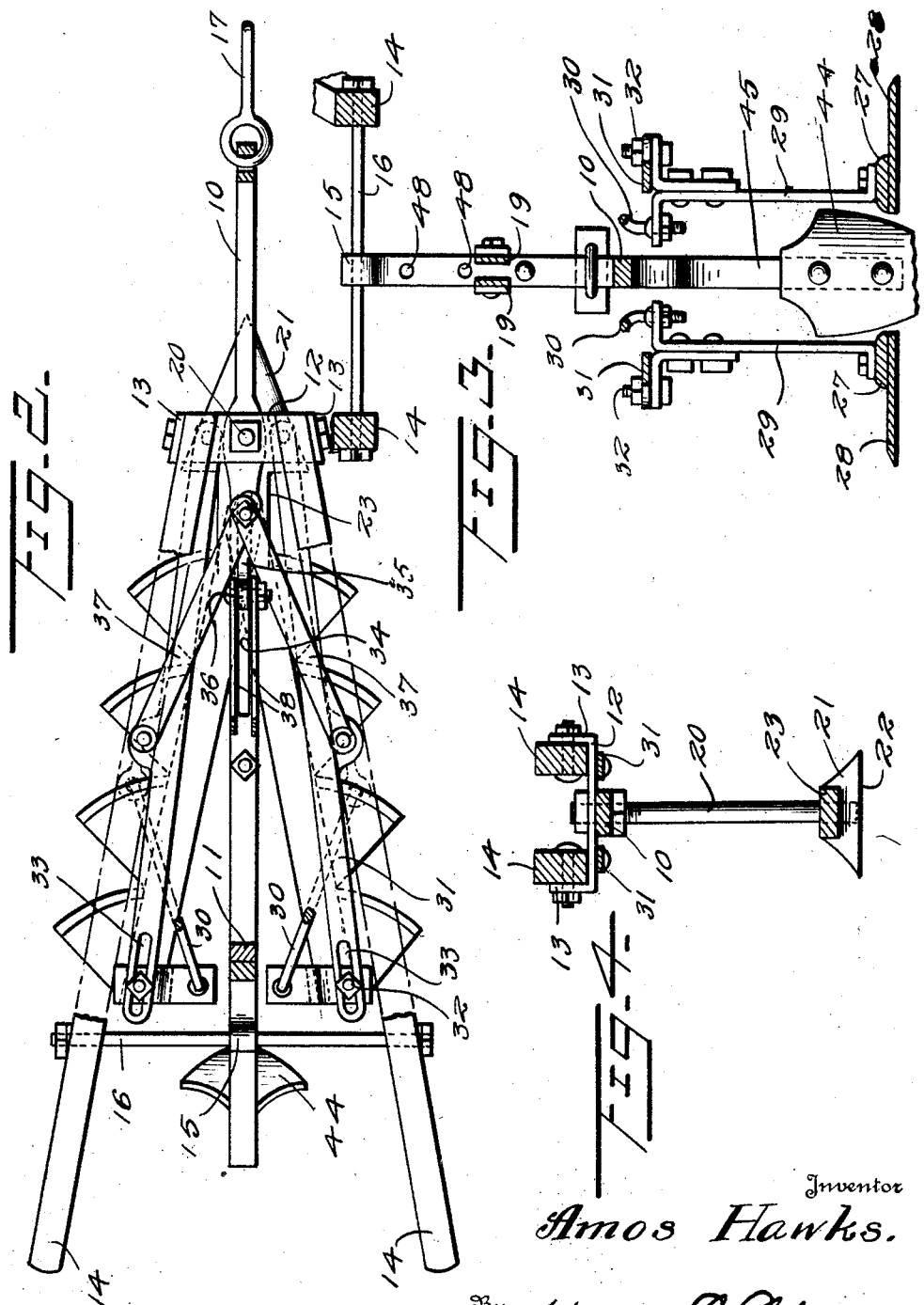
Inventor
*Amos Hawks.*
By *Watson E. Coleman*
Attorney Patented Oct. 18, 1927.

1,646,023

UNITED STATES PATENT OFFICE.

AMOS HAWKS, OF OGDEN, UTAH.

AGRICULTURAL IMPLEMENT.

Application filed June 26, 1926. Serial No. 118,591.

This invention relates to improvements in argricultural implements and more particularly to an improved combined weeding and ditching machine.

An important object of the invention is to provide a device of this character having blade carrying elements for severing weeds and the like below the surface of the ground and having means whereby these blade carrying elements may be adjusted to regulate the width of the cut formed thereby.

A further object of the invention is to provide a structure of this character so compacting the mounting and control elements of the weeder blades that a strong, durable structure is produced which may be readily operated to change the width of the cut without checking the operation thereof.

These and other objects I attain by the construction shown in the accompanying drawings, wherein for the purpose of illustration is shown a perferred embodiment of my invention and wherein:—

Figure 1 is a side elevation of a cultivator constructed in accordance with my invention;

Figure 2 is a section on the line 2—2 of Figure 1;

Figure 3 is a section on the line 3—3 of Figure 1;

Figure 4 is a section on the line 4—4 of Figure 1;

Figure 5 is a detail plan view of the front shovel showing the manner of connecting the same to the knife blades and to the braces.

Referring now more particularly to the drawings, the numeral 10 generally designates a cultivator beam having an upturned rear end 11. Adjacent its forward end, a transverse bar 12 is secured to the beam and has upturned end portions 13 which are secured to the forward ends of handles 14 which diverge rearwardly. Between these handles in alignment with the upturned end portion 11 of the beam, a brace 15 extends and to this brace, the upturned end portion is attached preferably by forming in this upturned portion an eye 16 through which the brace is directed. The forward end of the beam is provided with means, as at 17, whereby a draft element may be secured thereto. Secured to the opposite side faces of the upturned end portion 11 are the rear ends of braces 18 which extend forwardly in parallel relation to a point adjacent their forward ends where they diverge, as at 19, and are each secured to one of the handles 14.

The transverse bar 12 is secured to the beam 10 by the upper end of a vertical post 20, the lower end of which has rigidly secured thereto a share 21 having a flat bottom face 22. From the upper end of this share, there is a rearward extension 23 terminating in an upwardly and rearwardly angling portion 24 formed as a coulter. To this coulter is secured the lower end of a rigid brace 25, the upper end of which is secured to the beam 10. The horizontal extension mounts a pivot 26 to the lower end of which is secured the forward ends of blade arms 27, each provided upon their outer faces with teeth or blades 28 for cutting the roots of weeds or the like. These blades each have at their rear end a vertically disposed rigid extension 29, the upper end of which is connected by a link 30 with a corresponding handle 14.

The upper end of each brace has further secured thereto the rear end of a lever 31, the connection being in the form of a securing element 32 directed through a slot 33 extending longitudinally of the lever. The forward ends of these levers are pivoted to the transverse bar 12 at opposite sides of the beam 10. Slidably mounted in a longitudinally extending vertically directed slot 34 formed in the beam 10 between the transverse bar 12 and the point of attachment of the brace 25 is a cross head 35 having an angular vertically directed rear end 36. To this cross head are pivotally secured the forward ends of links 37, the rear ends of which are pivotally secured to the levers 31 at points intermediate the ends thereof. To the vertically extending portion of the cross head is secured the forward end of a link 38, the rear end of which is pivotally connected, as at 39, to the lower end of a lever 40 pivoted to the braces 18, as at 41. The braces 18 have further secured thereto a segment 42 with which a latch 43 carried by the lever coacts.

The vertically extending portion 11 provides means for attaching thereto a ditching shovel 44. In the present illustration, the ditching shovel is provided with a helve 45, the upper end of which is forwardly offset, as at 46, and provided in the offset portion with a series of longitudinally spaced openings 47 coacting with openings 48 formed in the vertically extending portion 11 to receive securing elements whereby the ditching shovel may be held in vertically adjusted positions.

In the operation of the device, the lever 40 is adjusted to determine the degree of divergence of the serrated bars 27 and accordingly the width of the cut which is formed. These bars may be swung to a position where they parallel one another and have their adjacent faces in substantially contacting relation or to a relatively wide angle, so that the range of adjustment provided is considerable. The ditching shovel 44 may be employed or not, as is desired and when not employed may be secured in an elevated position, such as illustrated in dotted lines in Figure 1, so that it does not come into contact with the ground. It will be noted that the plow point at the front of the machine will sever the ground, permitting the blades 28 to more readily enter beneath the surface of the soil and sever the roots of the weeds which are to be removed. In addition to severing these roots, the blades serve to loosen the top soil, so that it will remain moist.

Since the construction hereinbefore set forth is obviously capable of a certain range of change and modification without materially departing from the spirit of the invention, I do not limit myself to such specific structure except as hereinafter claimed.

I claim:—

1. A cultivator comprising a beam provided at a point between its ends with a longitudinally disposed slot, a standard attached to the beam at a point in advance of the slot, a share carried at the lower end of the standard, a brace connected at one end with the share and at its other end with the beam at a point behind the slot, blades pivoted to the share at a point between the standard and the brace, a cross head mounted for sliding movement along the slot, a lever mechanism for moving the cross head, and means operatively connecting the cross head with the blades.

2. A cultivator comprising a beam provided at a point between its ends with a longitudinally disposed slot, said beam being provided at its rear end with an angularly disposed portion, a standard attached to the beam at a point in advance of the slot, a share carried by the standard, a brace connected at one end with the share and at its other end with the beam at a point behind the slot, blades pivotally connected with the share at a point between the standard and the brace, handles connected with the upper end of the angular extension of the beam and connected at their forward ends with the beam approximately at the point of connection between the standard and the beam, a lever mechanism carried by the handles and the angular extension of the beam and operatively connected with the cross head, and means operatively connecting the cross head with the blades.

In testimony whereof I hereunto affix my signature.

AMOS HAWKS.